(12) United States Patent
Anastasio

(10) Patent No.: US 8,294,394 B2
(45) Date of Patent: Oct. 23, 2012

(54) BRAKING SYSTEM FOR THE UNDERCARRIAGE OF AN AIRCRAFT

(75) Inventor: Vincenzo Anastasio, Pomigliano D'Arco (IT)

(73) Assignee: Alenia Aeronautica S.p.A., Pomigliano d'Arco (IT)

( * ) Notice: Subject to any disclaimer, the term of this patent is extended or adjusted under 35 U.S.C. 154(b) by 418 days.

(21) Appl. No.: 12/694,694

(22) Filed: Jan. 27, 2010

(65) Prior Publication Data
US 2010/0188029 A1   Jul. 29, 2010

(30) Foreign Application Priority Data
Jan. 28, 2009 (EP) .................................. 09425022

(51) Int. Cl.
*H02P 3/14* (2006.01)
(52) U.S. Cl. ..... 318/380; 318/375; 318/376; 310/49.22; 310/268; 310/180; 244/111; 244/50; 244/49; 244/229
(58) Field of Classification Search .............. 310/49.22, 310/268, 180; 318/380, 375, 376; 244/111, 244/50, 49, 229
See application file for complete search history.

(56) References Cited

U.S. PATENT DOCUMENTS

| | | | | |
|---|---|---|---|---|
| 3,724,916 A * | 4/1973 | Hirzel | ........................... | 303/126 |
| 3,729,234 A * | 4/1973 | Hirzel | ........................... | 303/126 |
| 3,768,873 A * | 10/1973 | Hirzel | ........................... | 303/126 |
| 5,925,965 A * | 7/1999 | Li et al. | ........................ | 310/268 |
| 6,487,096 B1 * | 11/2002 | Gilbreth et al. | ................. | 363/35 |
| 7,226,018 B2 * | 6/2007 | Sullivan | ........................ | 244/111 |
| 7,237,748 B2 * | 7/2007 | Sullivan | ........................ | 244/111 |
| 7,325,498 B2 * | 2/2008 | Kumar et al. | .................. | 105/35 |
| 7,669,534 B2 * | 3/2010 | Kumar et al. | .................. | 105/35 |
| 2005/0224642 A1 | 10/2005 | Sullivan | | |

FOREIGN PATENT DOCUMENTS
WO    WO97/44880    11/1997
* cited by examiner

*Primary Examiner* — Rita Leykin
(74) *Attorney, Agent, or Firm* — Gottlieb, Rackman & Reisman, P.C.

(57) ABSTRACT

A braking system for an aircraft provided with undercarriage, wherein an axial-flux reversible electric machine is set between the wheel and the frame of the undercarriage; current-dissipating resistors are provided, which can be connected to the windings of the axial-flux reversible electric machine during rotation of said wheel for dissipating by the Joule effect the induced currents generated by the axial-flux electric machine, which behaves as current generator, and producing a braking effect that slows down the movement of the wheel, thus exerting a braking action.

17 Claims, 4 Drawing Sheets

BRAKING SYSTEM FOR THE UNDERCARRIAGE OF AN AIRCRAFT

The present invention relates to a braking system for the undercarriage of an aircraft.

BACKGROUND OF THE INVENTION

As is known, during the operations of landing of an aircraft, the latter must be braked in order to reduce its speed and so that it comes to a halt in safe conditions within the length of the landing strip. Braking of the aircraft occurs by means of the action of brakes of an aerodynamic type and by means of the action of mechanical brakes coupled to the wheels of the undercarriage of the aircraft.

Currently, undercarriages of aircraft are provided with mechanical disk brakes which are operated by pressurized oil coming from a hydraulic circuit; in particular, the braking action is modulated manually by the pilot by acting on a brake pedal that acts on valves of the hydraulic circuit.

As is known, disk brakes are subject to rapid wear on account of the high kinetic energy that must be dissipated during braking of the aircraft.

The disk brakes moreover reach very high temperatures that may jeopardize their efficiency and drastically reduce their service life.

SUMMARY OF THE INVENTION

The aim of the present invention is to provide a braking system for the wheels of the undercarriage of an aircraft that will solve the problems of known mechanical braking systems.

The above aim is achieved by the present invention in so far as this regards a braking system for an aircraft provided with undercarriage in which an axial-flux reversible electric machine is set between the wheel and the frame of the undercarriage, current-dissipating means being provided, which can be connected to the windings of said axial-flux reversible electric machine during rotation of said wheel during landing in order to dissipate in the current-dissipating means the induced currents generated by the machine, which behaves as current generator, and produce a braking effect that slows down movement of said wheel.

BRIEF DESCRIPTION OF THE DRAWINGS

The invention will now be illustrated with particular reference to the attached drawings, which illustrate a preferred non-limiting example of embodiment thereof and in which.

DETAILED DESCRIPTION OF THE INVENTION

Figure 1:
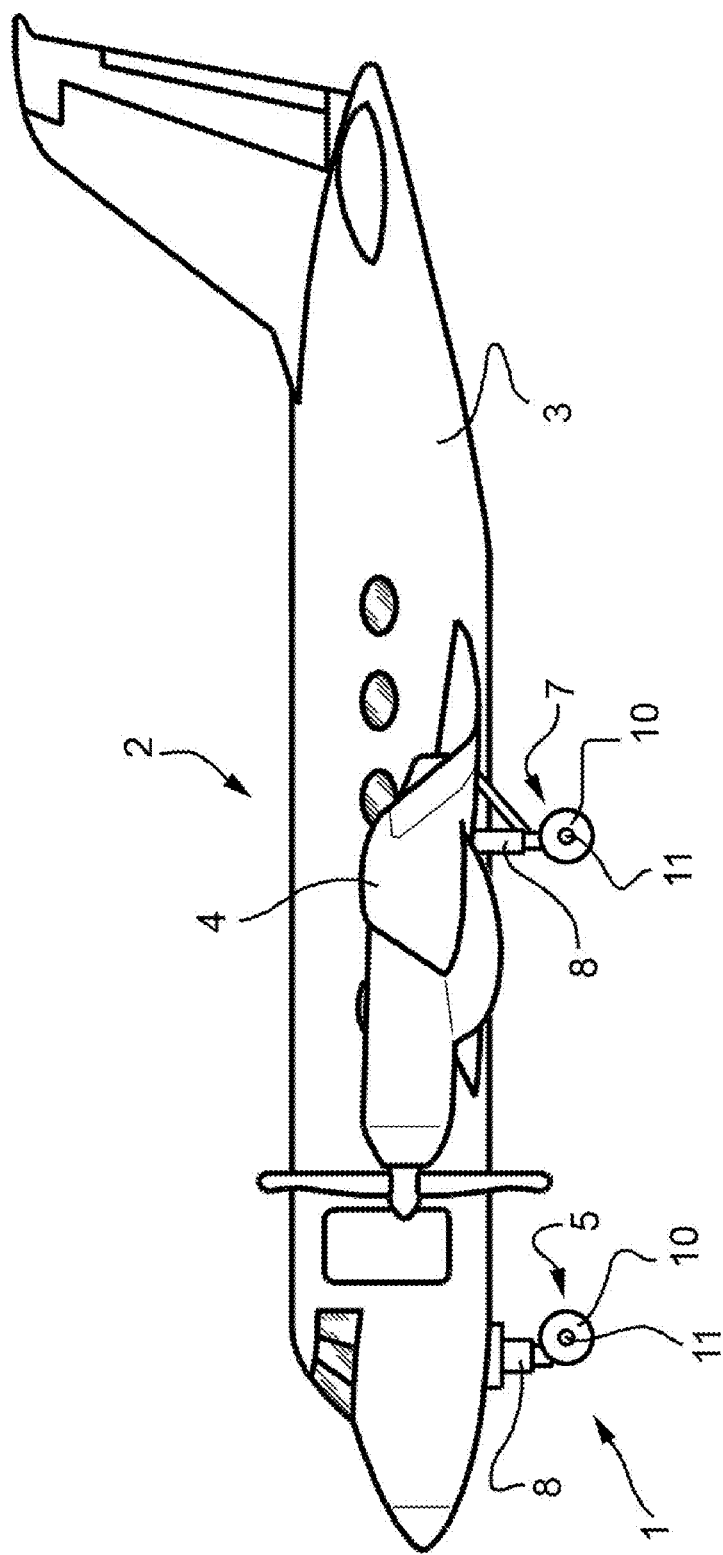
FIG. 1 is a schematic illustration of an aircraft that uses the system of the present invention.

In FIG. 1 designated as a whole by 1 is a braking system for an aircraft 2 (represented schematically) comprising a fuselage 3, two side wings 4, a front undercarriage 5 carried by the fuselage 3 and two lateral undercarriages 7 which are each carried in the example of embodiment, by a corresponding wing 4.

Each of the undercarriages 5, 7 comprises a respective frame 8, a top terminal portion of which is coupled to a corresponding load-bearing structure (not illustrated) of the aircraft 2, and an opposite bottom terminal portion of which carries hinged thereto, in the particular example described, one or more pairs of idle wheels 10 hinged to the frame 8 so as to turn about a corresponding hinge axis 11.

Figure 2:
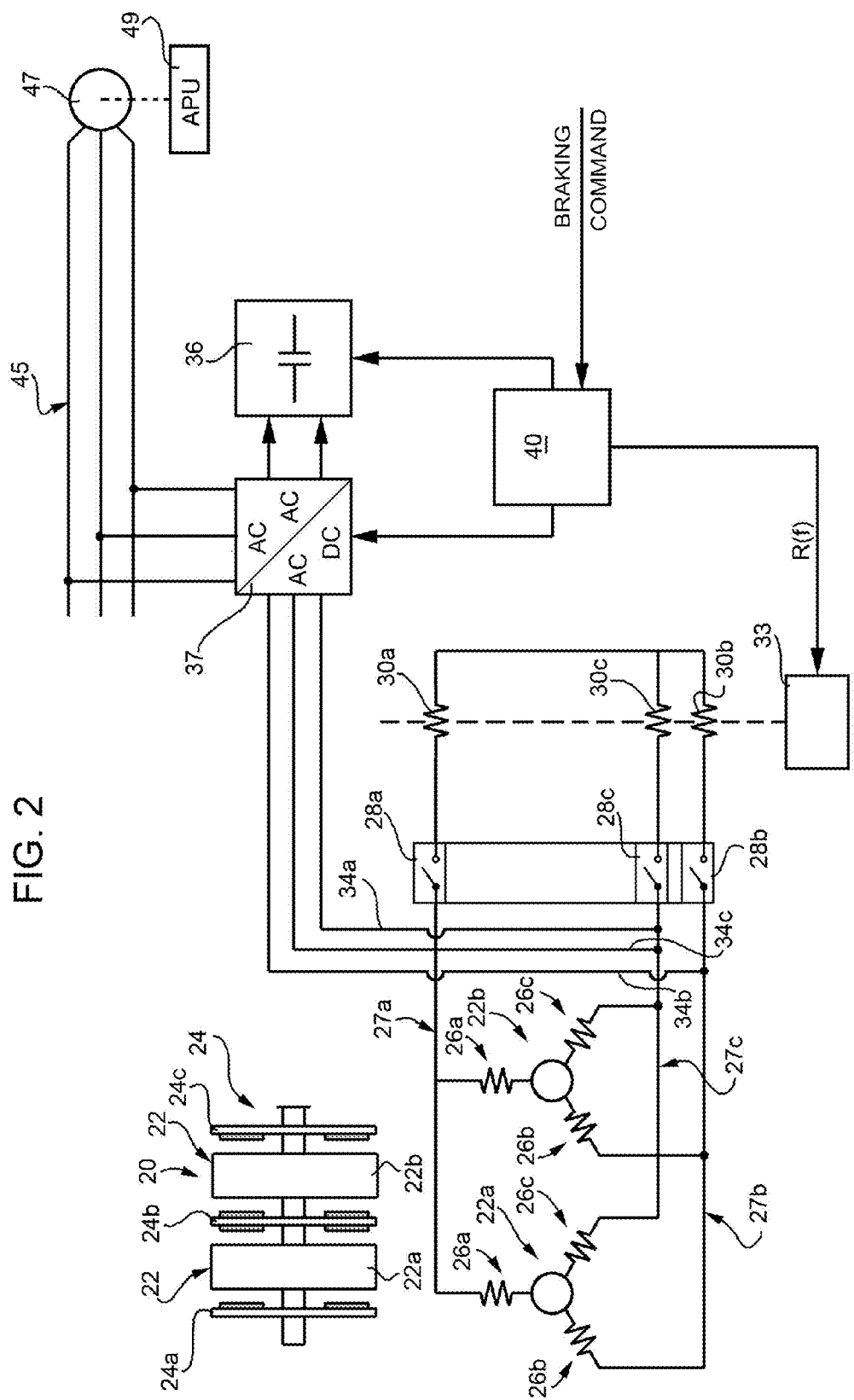
FIG. 2 is a simplified electrical diagram of the system according to the present invention.
Figure 3:
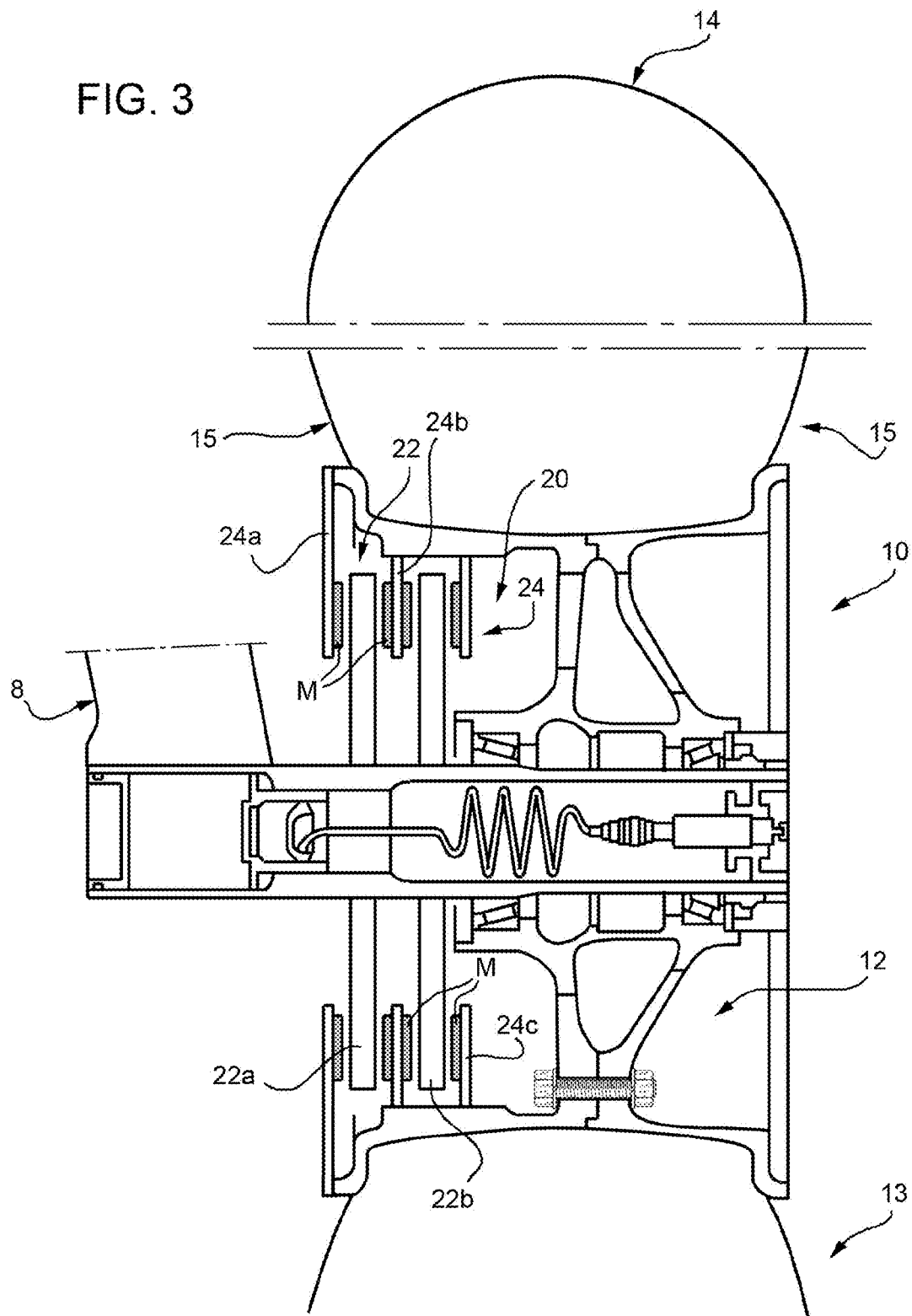
FIG. 3 illustrates, at an enlarged scale, a mechanical detail of an undercarriage.

Each wheel 10 (FIG. 2) comprises a disk 12 and a tyre 13, which, in turn, comprises a tread 14 and two lateral sides 15.

In the particular example described, the undercarriages 5 and 7 are of a retractable type and for this reason are associated to respective movement assemblies, in themselves known and not described in detail, which are each designed to displace the corresponding undercarriage 5, 7 between a retracted resting position (not illustrated), in which the undercarriages 5, 7 are completely housed in a seat of the fuselage 3 and of the wings 4, respectively, and an operative extracted position (illustrated in FIG. 1), in which the undercarriages 5, 7 extend downwards from the fuselage 3 and from the wings 4 themselves.

According to the preferred example of the present invention (FIG. 2) an axial-flux reversible electric machine 20 is set between the wheel 10 and the frame 8 in such a way that the stator 22 is angularly fixed with respect to the frame 8 and the rotor 24 is angularly fixed with respect to the wheel 10.

In the example of embodiment illustrated, the axial-flux electric machine 20 (of a known type) comprises a first stator 22a and a second stator 22b, which are fixed with respect to the frame 8, and three rotors 24a, 24b, 24c which are angularly fixed with respect to the wheel 10. Each rotor, made according to known technologies, comprises a disk made of non-magnetic metal material, arranged on which are a plurality of permanent magnets M angularly set at a distance apart from one another. Typically the permanent magnets, of a plane type, have in plan view a trapezial shape.

Each stator 22 comprises a toroidal core made of ferromagnetic material (not illustrated), in which a plurality of slots are made, said slots housing insulated electrical conductors wound around the toroidal core to provide a first winding 26a, a second winding 26b, and a third winding 26c, which have first terminals connected to one another and second terminals connected, respectively, to a first electrical line 27a, a second electrical line 27b, and a third electrical line 27c.

Each electrical line 27a, 27b, 27c communicates with respective first terminals of a single three-phase switch (for example, a static switch) designed to close/open three contacts 28a, 28b, 28; the three-phase switch has second terminals connected, respectively, to a first terminal of a variable resistor 30a, 30b, 30c having a second common connection terminal.

The value of resistance R(f) formed by the variable resistor 30a, 30b, 30c is modifiable on the basis of a control signal set by a control block 33 under the manual action of the pilot, who can act on a brake pedal (not illustrated).

In this way, by closing each contact 28a, 28b, 28c, the first, second, and third windings 26a, 26b, 26c are closed on a respective variable resistor 30a, 30b, 30c.

Each first terminal of the three-phase static switch is connected to a terminal of an electrical line 34a, 34b, 34c, which communicates with a device 36 (of a known type) in which electrical charge can be accumulated through an AC/DC converter 37.

Switching of the three-phase switch and operation of the converter 37 and of the device 36 are controlled by an electronic unit 40, which enables braking of the aircraft 2 with the modalities that will be clarified hereinafter.

Also present on the aircraft 2 is a three-phase electrical network 45 supplied by a current generator 47 (APU—auxiliary power unit) actuated by one of the engines and/or by an auxiliary turbine 49.

The converter 37 itself is also provided with an AC/AC converter, which interfaces with the on-board three-phase electrical network 45.

The electronic unit 40 controls, with the modalities that will be clarified hereinafter, communication of the three-phase electrical network 45 with the electrical lines 27a, 27b, 27c through the AC/AC-electric-power-conversion section according to techniques of a known type that will not be described in further detail.

The electronic unit 40 moreover communicates with the block 33 for actuation of the pedal-braking control.

In use, during landing of the aircraft 2, following upon contact between the lateral undercarriages 7 and the runway, the wheels 10 are set in fast rotation drawing along with them the rotors 24a, 24b, 24c, which move with high angular velocity with respect to the stators 22, which are fixed with respect to the frame 8.

In this way, electromotive forces are induced on the windings 26a, 26b, 26c in so far as the axial-flux electric machine 20 behaves as a current generator.

The electronic unit 40 then issues a command for closing of the contacts 28a, 28b, 28c in such a way that the induced currents generated by the current generator 20 reclose in the resistors 30a, 30b, 30c, where the electrical energy is converted into heat by the Joule effect.

The induced currents have a direction that opposes the cause that has generated them, i.e., the movement of the rotors 24a, 24b, 24c within the magnetic field of the stator 22.

Consequently, a braking effect is produced, which slows down the movement of the rotor 24 and hence of the wheel 10 given the same braking power.

The braking effect is all the more intense the higher the velocity of the rotor 24 with respect to the stator 22.

According to this principle of operation, the braking action is maximum at the moment of contact of the aircraft 2 with the runway and decreases as the speed of the aircraft 2 decreases.

In addition, by means of the control block 33, the pilot can modify the value of resistance R(f) and hence the value of the current dissipated by the resistors and modulate the braking force as a function of the velocity of the wheel 10. In other words, the intensity of the braking action is given by the amount of current induced on the windings of the stator elements 26a, 26b, 26c, which is determined by the value of the three-phase resistance R(f) that can be modulated by means of the action by the pilot on the brake pedal.

In this way, unlike the majority of mechanical brakes which function exploiting forces of friction, the principle of operation of the braking system of the present invention does not involve parts subject to wear.

For each pair of wheels 10 the system in question then enables actuation of an intrinsic anti-skid (ASK) control (of an ABS type) capable of modulating the braking action following upon a non-uniform deceleration of the wheels 10. In particular, in the case of blocking of a wheel 10 due, for example, to skidding phenomena, the system blocks automatically its braking action in so far as it does no longer receives energy for developing the antagonist resistant torque.

The amount of electric power not used for braking is transferred, through the electrical lines 34a, 34b, 34c and the AC/DC converter 37, within the device 36, where the electric charge is accumulated in an accumulation system of a supercapacitive type.

When the speed of rotation of the wheel 10 drops below a first threshold value such that the intensity of the induced electromotive force would cause in turn a reduction of the intensity of the braking action, the electronic unit 40 issues a command for a gradual reduction of resistance (up to the short-circuit point) so as to maintain the currents in the stator windings high. When the velocity of the wheel drops below a value such that the braking action by induction becomes negligible, the electronic unit 40 issues a command for charge transfer from the device 36, which releases the charge accumulated.

When the velocity of rotation of the wheel 10 drops below a second threshold value lower than the first, the on-board electrical network 45 intervenes. In particular, the electronic unit 40 is able to detect the angular velocity of the wheel 10 (i.e., of the rotor disks 24a, 24b, 24c) and simultaneously its instantaneous derivative (intensity of the deceleration) issuing a command, through the converter 37, for the on-board electrical network 45 to supply appropriate current pulses such as to create a counter-rotating impulsive magnetic field that opposes advance of the wheel, thus supplying a further braking action.

In this case, by use of the on-board electrical network 45, the electric machine 20 supplies further braking power.

Thus in this way the final arrest of the aircraft 2 can be made in a totally "electrical" way without using any brake of a mechanical type for enabling final arrest of the means.

The aircraft 2 can be provided with a parking brake with mechanical blocking (by means of a pawl-and-ratchet mechanism of a known type, not illustrated), which is electrically activated and de-activated.

The electronic unit 40 can also be configured so as to cause the on-board electrical network 45 to supply through the converter 37 the electric machine 20 with a current having a direction such as to obtain rotation of the reversible electric machine and displacement of the aircraft 2 on the runway.

The reversibility of the machine 20 determines, in fact, the possibility of using the system 1 described also for the operations of taxiing of the aircraft 2 on the runway. In this case, the power for supply of the system, necessary for obtaining the static torque useful for movement of the aircraft, is drawn directly from the on-board electrical network 45 without any need for turning on the main engines, exploiting, for example, the APU generator 49 (which is already in itself operative during ground loading).

In the braking system described above, in which the reversible electric machines are of a three-phase type, there exists a direct proportionality between the antagonistic braking torque and the radius r of the wheel 10 (arm of the torque) that is of a cubic type, i.e., $C=f(r^3)$.

Figure 4:
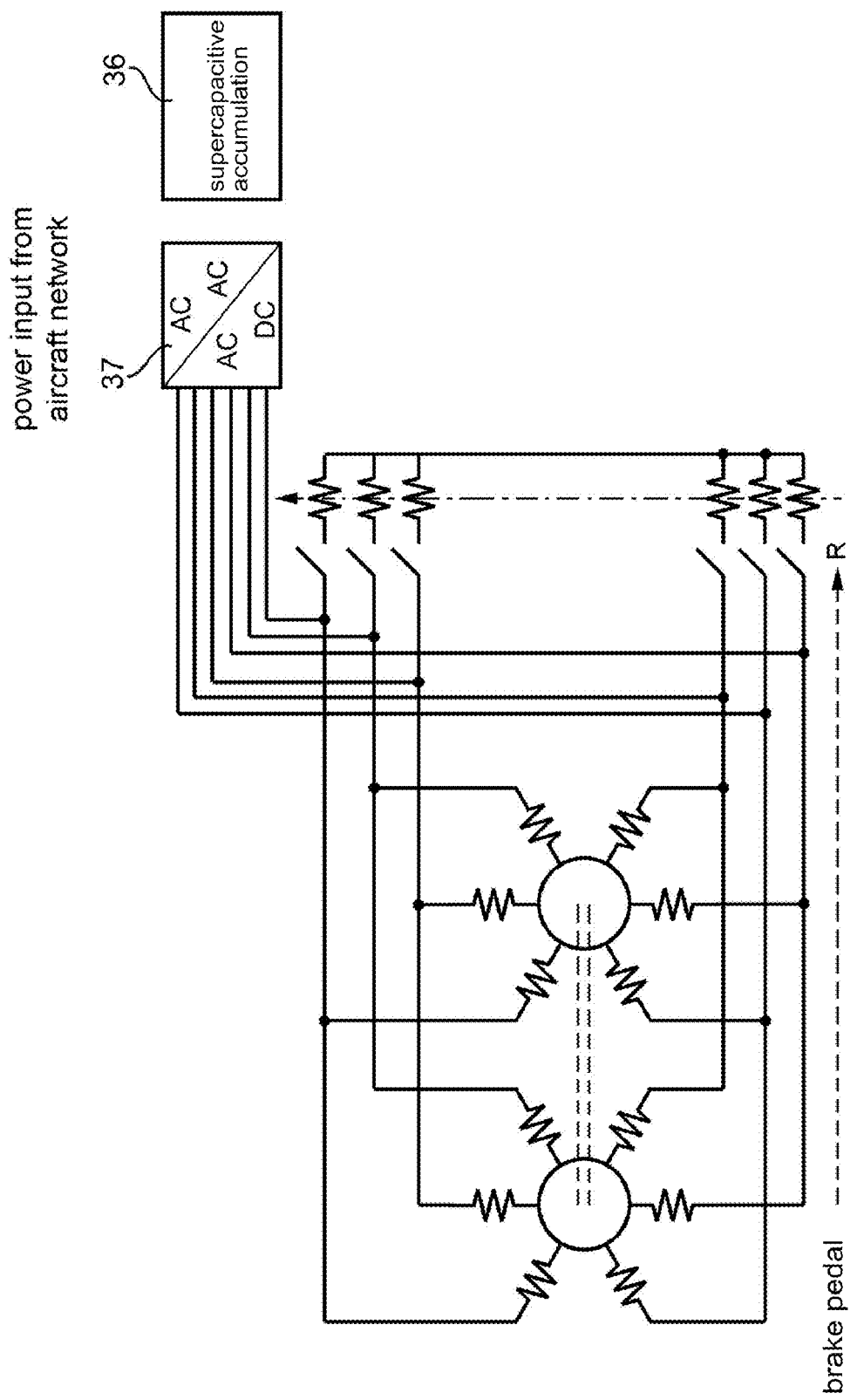
FIG. 4 illustrates a variant to the braking system of FIG. 1.

However, since the radius of the wheel 10 is a fixed amount and the quantities involved are sufficiently high, an increase in the braking torque can be obtained using an electric machine 20 of a "hexaphase" type, as illustrated in FIG. 4.

On this hypothesis, the increase in the number of phases (corresponding to a decrease in the polar pitch of the machine) determines an increase in the induced counter-electromotive force (i.e., in the resistant torque acting on the wheel 10) given the same size and velocity of rotation of the rotor 24 (and hence given the same of intensity of the current induced on each phase).

The invention claimed is:

1. A braking system for an aircraft provided with undercarriage, wherein an axial-flux reversible electric machine is set between the wheel and the frame of the undercarriage; current-dissipating means being provided, which can be connected to the windings of said axial-flux reversible electric machine during turning of said wheel during landing for dissipating in the current-dissipating means the induced currents generated by the machine, which behaves as current generator, and producing a braking effect, which slows down the movement of said wheel wherein control means are provided, which are designed to carry out transfer of charge from said accumulation device to said axial-flux reversible electric machine, thus supplying further power for the braking action; and wherein said control means carry out charge transfer when the velocity of rotation of the wheel drops below a first threshold value.

2. The system according to claim 1, wherein the stator of the axial-flux reversible electric machine is fixed with respect to the frame, and the rotor of the axial-flux reversible electric machine is angularly fixed with respect to the wheel.

3. The system according to claim 1, wherein said current dissipator comprise resistor means.

4. The system according to claim 3, wherein said resistor means have variable resistance R(f) that varies on the basis of a command in order to modulate the braking action.

5. The system according to claim 1, wherein an accumulation device is provided, in which electric charge can be accumulated and which can be connected to said axial-flux reversible electric machine to store the charge that has not been dissipated in said current-dissipating means.

6. The system according to claim 1 wherein said control means carry out transfer of electrical energy from an electrical network of the aircraft to said axial-flux reversible electric machine, thus supplying further power for the braking action.

7. The system according to claim 6, wherein said control means carry out transfer of electrical energy from the electrical network of the aircraft to said reversible electric machine when the velocity of rotation of the wheel drops below a second threshold value lower than the first.

8. The system according to claim 1, wherein said control means, following upon completion of the braking operations, are configured for controlling a flow of current from the on-board electrical network to the electric machine in a direction such as to obtain rotation of the reversible electric machine and generation of a torque that obtains displacement of the aircraft on the runway.

9. A braking system for an aircraft provided with undercarriage, wherein an axial-flux reversible electric machine is set between the wheel and the frame of the undercarriage; current-dissipating means being provided, which can be connected to the windings of said axial-flux reversible electric machine during turning of said wheel during landing for dissipating in the current-dissipating means the induced currents generated by the machine, which behaves as current generator, and producing a braking effect, which slows down the movement of said wheel, wherein the axial-flux electric machine is of a three-phase type and comprises a first winding, a second winding, and a third winding, which have first terminals connected to one another and second terminals connected, respectively, to a first electrical line, a second electrical line, and a third electrical line which can be connected to said current-dissipating means.

10. A braking system for an aircraft provided with undercarriage, wherein an axial-flux reversible electric machine is set between the wheel and the frame of the undercarriage; current-dissipating means being provided, which can be connected to the windings of said axial-flux reversible electric machine during turning of said wheel during landing for dissipating in the current-dissipating means the induced currents generated by the machine, which behaves as current generator, and producing a braking effect, which slows down the movement of said wheel wherein the axial-flux electric machine is of a hexaphase type.

11. The system according to claim 9, wherein the stator of the axial-flux reversible electric machine is fixed with respect to the frame, and the rotor of the axial-flux reversible electric machine is angularly fixed with respect to the wheel.

12. The system according to claim 9, wherein said current dissipator comprise resistor means.

13. The system according to claim 9, wherein an accumulation device is provided, in which electric charge can be accumulated and which can be connected to said axial-flux reversible electric machine to store the charge that has not been dissipated in said current-dissipating means.

14. The system according to claim 10, wherein the stator of the axial-flux reversible electric machine is fixed with respect to the frame, and the rotor of the axial-flux reversible electric machine is angularly fixed with respect to the wheel.

15. The system according to claim 10, wherein said current dissipator comprise resistor means.

16. The system according to claim 10, wherein an accumulation device is provided, in which electric charge can be accumulated and which can be connected to said axial-flux reversible electric machine to store the charge that has not been dissipated in said current-dissipating means.

17. The system according to claim 10, wherein the axial-flux electric machine is of a three-phase type and comprises a first winding, a second winding, and a third winding, which have first terminals connected to one another and second terminals connected, respectively, to a first electrical line, a second electrical line, and a third electrical line which can be connected to said current-dissipating means.

* * * * *